UNITED STATES PATENT OFFICE 2,362,060

PLASTERBOARD

Joseph John Etridge, Norton-on-Tees, John Briscoe Sandford, Saltburn, and Victor Lefebure, London, England, assignors to Imperial Chemical Industries Limited, a corporation of Great Britain No Drawing. Application September 29, 1941, Serial No. 412,896. In Great Britain February 22, 1938

9 Claims. (Cl. 154—45.9)

(Granted under the provisions of sec. 14, act of March 2, 1927; 357 O. G. 5)

This invention relates to the manufacture of composite wallboard or plaster board consisting of a core of a cementitious material bonded to covers of pulp board, cardboard, paper or the like, generally referred to as liners. This application is a continuation-in-part of our application Serial No. 257,821.

In plaster board the cementitious material most generally used for the core is plaster of Paris: catalysed anhydrite plaster and mixtures of plaster of Paris and anhydrite plaster can also be used. Set plaster of Paris suffers from the defects that it does not possess good resistance to the effect of moisture in the form of humid air, it is readily softened by water, it has a high water absorbing capacity, low resistance to water erosion and very low strength when saturated with water. Hence boards made with a plaster of Paris core whilst giving excellent performance when used in dry situations, such as within buildings, cannot be used in outside positions where they would be exposed to the effect of weather and particularly of water. On the other hand ordinary cements such as Portland, Portland blast furnace slag cement, or aluminous cements whilst all possessing excellent resistance to water and being suitable for use outside do not bond to paper and cannot therefore be used as the core for wallboards. Furthermore it is one of the great advantages of the use of plaster of Paris as the core constituent that, owing to its quick setting properties, boards made from it can be produced on fast continuous machines and that the length of conveyor belt between the fabricating rolls and the board cutting device and therefore the size of the plant can be kept to a minimum. On the other hand all of the above types of cement set so slowly and take so long to attain a degree of set suitable for cutting that they could not be used to fabricate board on one of these fast continuous machines.

It is the object of this invention to produce a wallboard with a core possessing almost as good resistance to the effect of moisture and water as ordinary cements and yet which has such an early set that it can be used for the fabrication of wallboard on a fast continuous machine of the type well known in the art. It is a further object of the invention to provide a wallboard which can be used outside exposed to atmosphere.

We have found that certain core compositions as herein set forth and comprising mixtures of plaster of Paris and ground blast furnace slag, to which has been added a minor proportion of exciter, such as ground Portland cement clinker, can be bonded to paper to give a sound strong board, and that they can be made to set sufficiently quickly to render them capable of being used on a fast continuous board machine. Part of the plaster of Paris may be replaced by anhydrite or gypsum, but generally the only calcium sulphate constituent will be plaster of Paris with some special gypsum added as an accelerator for the mix. The set core has greatly improved resistance towards moisture and damp conditions as compared with plaster of Paris, and in these respects has properties aproaching those of Portland cement.

The plaster of Paris should be prepared from rock gypsum and in any case must be free from phosphates because these prevent the desired reaction between the plaster of Paris and the blast furnace slag. We have not found plaster of Paris made from by-product gypsum to be suitable for our compositions. The blast furnace slag will generally have the following composition:

| | Per cent by weight |
|---|---|
| CaO | 25–55 |
| SiO$_2$ | 25–50 |
| Al$_2$O$_3$ | 5–35 |

The per cent of SiO$_2$ preferably is less than 40%. The blast furnace slag and the Portland cement should be extremely finely ground in order that the secondary reaction between the complex aluminates and the calcium sulphate may proceed to completion. We have found that if the slag and clinker are ground so that 60% by weight of the particles are less than 30 microns, and if the fineness of the final mixed composition is the same as this, good results are obtained. As will be described later there are other reasons for grinding the slag and cement to this degree of fineness. The maximum proportion of slag that may be used is 60%. We have found that with higher proportions of slag than this the bond between the core and the liners is defective and the boards are consequently unsound, that it is not possible to obtain sufficiently early cutting set to make possible the use of the composition on a fast continuous machine, and, furthermore, that the set cores crack and disintegrate on repeated exposure to wetting and drying. The last mentioned defect is apparently due to expansion resulting from a further secondary reaction. Below 60% slag these defects are not found. On the other hand we have found that below 40% slag the resistance to the effect of moisture and wetting falls off very considerably. We therefore limit ourselves to the range of compositions:

| | Parts by weight |
|---|---|
| Plaster of Paris | 40–60 |
| Blast furnace slag | 60–40 |
| Exciter | 1–15 |

The exciter may be Portland cement, ground Portland cement clinker or any equivalent lime-containing or lime-producing material. That is, the exciter comprises lime in such form or condition as to be available for promoting the desired reaction between the calcium sulphate and the blast furnace slag; and the expression "available lime" as employed in the appended claims is to be understood as having such significance. Part of the plaster of Paris may be replaced by anhydrite or gypsum or mixtures of these. Anhydrite appears sometimes to promote the efficiency of the secondary action: this may be connected with minor differences in the blast furnace slag, which of course is fairly variable in composition. The gypsum as will be described later is chiefly added to promote the first set of the material.

We have also found that successful results can only be achieved if due regard is paid to the proportion of core adhesive employed, as indicated below. It is well known in the manufacture of gypsum wallboard that the bonding of plaster of Paris to the liners is not sufficiently good to give a commercially sound strong board and consequently adhesive materials such as soluble natural gums, e. g., gum arabic, karaya gum, dextrines, dextrinated starches, starches, urea and thiourea formaldehyde syrups and the like, must be added to the core mix to promote this bond. The amount of these materials that may be thus used in wallboard of the prior art may vary between 0.5 and 5%, e. g., 2% dextrine and 2½% urea formaldehyde syrup are suitable quantities, and it is common practice to increase the quantity of adhesive if for any reason poor bond is obtained on the plant. We have found that the kind and proportion of adhesive that can be used with our novel compositions are critical, and particularly that the addition of all types of soluble or water dispersible organic materials markedly affects the strength of the set core. We have further found that, whilst up to 1% of organic modifier produces some falling off, the strength is sufficiently good to give a commercially good board. Beyond 1%, however, the loss in strength is so great that the boards are useless. We have found that additions of urea formaldehyde syrup do not give good bond with the compositions of the invention and they should not be used with them.

These points are illustrated in the tables.

Table 1 shows the benefit of the greatly improved resistance to moisture of these compositions as compared with ordinary plaster of Paris. In a composite material such as plasterboard, which consists of a cementitious core reinforced by paper liners, the tensile stress in bending is taken by the bottom liner, which functions similarly to steel in reinforced concrete, and the compressive stress is taken by the core.

The compressive strength of a normal set plasterboard core mix and that of our set new composition were compared. 2¾" standard compression cubes were made from the core mixes shown, which are as they would be used in plasterboard, and they were allowed to mature in humid air for two days and were then dried to constant weight at 70° C. One set of cubes was tested for compressive strength one hour after drying. The other set was exposed for 30 days in a humidity cabinet and was then tested as before.

*Table 1*

| Composition of mix, parts by weight | Compressive strength, lb./sq. in. | |
|---|---|---|
| | As made | After 1 month exposure to humid air |
| Stucco 100<br>Sawdust 2<br>Water 65 | 890 | 620 |
| Slag 60<br>Stucco 40<br>Portland cement 3<br>Water 31 | 4,295 | 5,638 |

In Table 2 the manner in which core bond varies with composition is brought out. Core bond is assessed by taking a sample of board about 6" square and attempting to strip off the liner parallel to the grain. With first class bond it is impossible to strip the liner from the core, the paper always tearing in itself, and an arbitrary adhesion value of 10 is allocated. With very poor adhesion the liner can be easily stripped from the core and leaves no paper fibre adhering to the latter: the arbitrary value of 0 (zero) is allocated. Intermediate degrees of adhesion are allocated numbers between 0 and 10. A value of 8 corresponds to a degree of adhesion in which the bare core is exposed to a distance of about 1/32 inch when the liner is stripped. This is the lowest value that is acceptable in first class board, although an adhesion value of 7 may be tolerated as the absolute limit in exceptional circumstances. On testing in this way an adhesion value of 7 permits the liner to be detached from the core over an area of which the depth is from 1/32 to 1/16 inch: an adhesion value of 6 similarly corresponds to stripping over a depth of 1/16–¼ inch. It is evident from the table that in compositions containing more than 70% slag the bond cannot be relied upon. The critical proportion of slag is about 65%, and the present invention is limited to proportions less than this. However, in order to provide a safety factor in the obtaining of consistently reliable adhesion in large scale manufacture we prefer to use proportions of less than 60%. As already mentioned above there are further reasons for selecting this upper limit.

Table 2

| Core adhesive | Adhesion value of core from following mixes ||||||||
| --- | --- | --- | --- | --- | --- | --- | --- | --- |
| | Slag 50, Stucco 50, Exciter 3 || Slag 60, Stucco 40, Exciter 3 || Slag 70, Stucco 30, Exciter 3 || Slag 80, Stucco 20, Exciter 3 ||
| | As made | After 2 days expos. to humid air | As made | After 2 days expos. to humid air | As made | After 2 days expos. to humid air | As made | After 2 days expos. to humid air |
| 1% dextrine | 10 | 8 | 9 | 8–7 | 9 | 5 | 8 | 3 |
| 1% urea formaldehyde syrup containing 50% solids | 7 | 3 | 4 | 0 | 0 | 0 | 0 | 0 |
| 5% urea formaldehyde syrup containing 50% solids | 10 | 6 | 9 | 6 | 0 | 0 | 0 | 0 |

A further advantage secured according to this invention is freedom from cracking. Compositions containing more than 70% slag tend to crack in after life owing to further reaction, and the critical proportion of slag is again about 65%.

This Table 2 also shows that urea formaldehyde syrups are not satisfactory for use as core adhesives in core mixtures which include blast furnace slag in accordance with the present invention.

The effect of organic modifiers used to improve core adhesion upon the transverse strength of the set core mix is given in Table 3 and from this it will be seen that the use of greater quantities than 1% of these materials causes serious falling off in strength. The water quantities given are those to give the consistency required on the plasterboard machine. 4" x 1" x 1" prisms were prepared and matured in humid air until they were tested.

quick setting and hardening. Rapid hardening is essential for good cutting. Table 4 indicates that as the proportion of slag increases beyond 70% the compositions become progressively slower setting and hence cannot be used at the same high rates of output. With higher slag contents a proportionately higher quantity of exciter is necessary. This is a further reason why we prefer mixes containing not more than 60% slag. The rate of hardening is measured by means of a small punch of the Brinell type and the hardness is assessed qualitatively by the diameter of the depression produced; the smaller this is, the harder the material. Practical experience shows that core compositions cannot be satisfactorily cut if the diameter of the depression is greater than 7.5 mms.

Table 3

| Composition of mix | Adhesive || Water per cent on composition | Transverse strength (lb.) of 4" x 1" x 1" prisms tested at 3" centres |||
| --- | --- | --- | --- | --- | --- | --- |
| | Type | Per-cent on composition | | 1 day | 3 days | 7 days |
| Slag 60, Stucco 40, Portland cement 4 | Dextrine | 1 | 40 | 100 | 143 | 143 |
| | do | 2 | 32.5 | 70 | 120 | 130 |
| | Gum arabic | 2 | 32.5 | 20 | 43 | 80 |
| | do | 2 | 32 | 37 | 57 | 75 |
| | Starch | 1 | 46 | 65 | 115 | 130 |
| | do | 2 | 62 | 30 | 35 | 70 |

Even with the mixes containing 40–60% slag the setting time tends to be rather longer than required for the range of plant speeds nec-

Table 4

| Composition of core | Exciter (Portland cement) | Water quantity, per cent | Initial set (Vicat) || Diameter of depression (mms.) at times given (mins.) |||||||||
| --- | --- | --- | --- | --- | --- | --- | --- | --- | --- | --- | --- | --- | --- |
| | | | Mins. | Secs. | 7 | 8 | 9 | 10 | 11 | 12 | 13 | 14 | 15 | 19 |
| Slag 80, Stucco 20 | 3 | 48 | 5 | 10 | | | | | 9.6 | | | | 9.2 | 9.2 |
| | 4 | 48 | 4 | 15 | | | | 9.4 | | | | | 9.4 | 9.4 |
| | 5 | 48 | 3 | 30 | | | | 10.1 | | | | 9.6 | | 10.2 |
| Slag 70, Stucco 30 | 3 | 49 | 4 | 30 | | | 9.0 | 9.0 | 8.5 | 8.4 | 8.0 | 7.9 | 8.0 |
| | 4 | 49 | 4 | 0 | | 9.6 | 9.0 | 9.0 | 8.5 | 8.7 | 8.5 | 8.5 | 8.0 | 7.7 |
| | 5 | 49 | 5 | 0 | | | 9.8 | | 8.9 | | 8.5 | | 8.3 | 8.1 |
| Slag 60, Stucco 40 | 2 | 49 | 4 | 20 | 9.6 | 8.8 | 9.1 | 7.6 | 7.4 | 7.2 | 7.1 | 7.2 | 7.1 | |
| | 3 | 49 | 4 | 15 | 9.7 | 8.7 | 7.8 | 8.0 | 7.5 | 7.2 | 7.4 | | 6.9 | |
| | 4 | 49 | 4 | 40 | | 8.5 | 9.1 | 7.9 | 7.8 | 7.4 | 7.3 | 7.4 | 7.1 | |
| Slag 50, Stucco 50 | 2 | 50 | 3 | 35 | | 8.4 | 7.2 | 7.1 | 6.8 | 6.9 | 6.5 | | | |
| | 3 | 50 | 2 | 45 | 8.7 | 8.0 | 7.8 | 7.4 | 6.9 | 7.0 | 6.7 | | | |
| | 4 | 50 | 3 | 10 | | | | 7.0 | 7.6 | 6.6 | 6.5 | | | |

As already mentioned, it is an important feature of our invention that the new compositions can be employed on normal continuous plasterboard machines because they are sufficiently essary to the high rate of output of modern machines. This appears to be partly due to the effect of the alkaline materials in the exciter and may also be influenced by variation in the slag.

We have found that these difficulties can be overcome by employing warm mixing water and by adding up to 15% of ground set plasterboard core calculated on the weight of the dry composition. The water may be heated to 30–70° C., but we prefer the range 30–50° C. as the control of mixing is much better. Table 5 shows the benefits that may be obtained in this way using 60 slag/40 stucco mix. Similar benefits are obtained with the mixes containing more stucco than this.

Table 5

| Composition of core mix, parts by weight | Temp. of gauging water, °C. | Gypsum accelerator, per cent | Initial set (Vicat) | | Cutting set, mins. |
|---|---|---|---|---|---|
| | | | Mins. | Secs. | |
| Slag 60 | 50 | | 9 | 15 | 16½ |
| Stucco 40 | 50 | 2.0 | 3 | 45 | 8¾ |
| Portland cement 3 | 35 | 2.0 | 4 | 0 | 9¼ |
| Dextrine 1 | 50 | 5.0 | 2 | 35 | 6½ |
| Water 45 | 50 | 10.0 | 2 | 10 | 5½ |

Boards of commercially acceptable standard can be produced from the compositions by the methods we have already described. However, with the use of the compositions in this manner occasional variations in bonding properties may be met with due to variations in the composition of the slag, and it is not permissible to meet this difficulty in the way in which the analogous difficulty is met in plaster of Paris boards, namely, by increasing the quantity of adhesive since such increase would seriously reduce the strength of the boards as above described. Moreover the presence of added adhesive in the cores of the present invention tends to reduce the compressive strength of the core. We have found a method of removing these difficulties which consists in eliminating the adhesive from the core mix and applying a special coating to the liner. This method, which possesses the combined advantages that the full strength of the set core is developed and that owing to the elimination of the core adhesive development of initial adhesion between paper and core mix and rate of set are greatly improved, consists in the application, to the specific core mixes of the present invention, of the invention described and claimed in pending application No. 215,922 and its continuations. In carrying out the aspect of the present invention we apply a coating of the following composition to the liners before they contact with the wet plastic mix used in the present invention as the plaster board core.

Stucco or plaster of Paris
parts by weight__ 100
Adhesive_____do____ 5–20
Retarder_____ To give suitable life
Water_____parts by weight__ 45–600

The preferred proportions of water lie between 60 and 150 parts by weight. The adhesive is a water soluble one selected from the class, water soluble gums, e. g., arabic, karaya, or tragacanth, water soluble dextrines, and starches.

The amount of water and the amount of retarder employed depend upon the method of application used, for example whether spray, roller, brush, doctor or trough. The coating is applied in a thickness of from 0.0005 and 0.05 inch, but we have found that the preferred thickness for reasons of efficiency and permanence of bond, rate of development of bond, and cost, lies between 0.0005 and 0.005 inch. We have found that the core mix may be applied to the coated liner whilst the surface of the coating is in the liquid condition or after it has dried. We find that the best results in the before-mentioned respects are obtained if the coating is in the unset liquid condition and if it has reached the tacky stage by evaporation of water into the air and absorption into the liner. It is essential that the liquid coating should not become dry before contact with the core mix else the bond will be very poor: it is also essential that a large proportion of gypsum should not have formed in the coating before it contacts with a plaster mix. It will be appreciated that the above conditions can be attained in many ways. We find that the optimum conditions are attained by using a coating mix containing from 50 to 600 parts of water, varied to suit the application means, and retarded so that 13 minutes after mixing the amount of combined water in the plaster has not risen by more than 2%. Organic scutch retarders or phosphate retarders composed of mixtures of sodium hexa- and meta-phosphates are suitable. With coating mixes of the above type the tacky stage is reached at from 10 seconds to 2 minutes after application, depending on the water quantity, and the application device should be arranged at such a distance in front of the master rolls and the plant run at such speed that these conditions are achieved. Furthermore it is desirable that a mix having a life of 13 minutes measured as described above should not be used after it has attained a life of 11 minutes.

Whilst we have given the above description of the preferred method of carrying out our invention, and the conditions we find to be necessary, we wish to make it clear that any variations in water quantity, retarder quantity, life of mix, time of application, which give conditions equivalent to those we have described come within the scope of this feature of our invention.

We have also stated that the coating may be used dry. We use the dry method and indicate its limitations as follows. The water quantity will not be less than 75% calculated on the stucco, and will lie preferably between 100% and 600%. The amount of coating should be reduced to a minimum on account of the danger of the dry coating cracking and flaking off: we prefer to use thicknesses of 0.0005 to 0.005 inch and weights of up to 0.25 lb. of liquid coating per sq. yard of liner. The coating is dried by passing the liner over a heated roll 15 to 90 seconds after applying the coating. The roll should be maintained at a temperature of 140 to 180° C. and the time of contact should be about 40 seconds.

*Example 1*

A plaster board core mix was employed as follows:

| | Parts by weight |
|---|---|
| Finely ground blast furnace slag | 50 |
| Plaster of Paris | 50 |
| Portland cement | 3.2 |

At least 60% of the mixed cement was of diameter not exceeding 30 microns, i. e., 60% of "flour."

The mix was gauged with 48% of water giving an initial set of about 9 minutes and a firm set of about 20 minutes. A normal plaster board liner of high jute content, of thickness .03 inch, was employed and plasterboard was formed in the usual way from such core mix and such liner. The board after forming and cutting was transferred to the drier where it was dried at 70° C. On testing for adhesion after manufacture the latter was found to be normal when measured dry and after exposure to humid atmosphere.

The process was repeated adding core adhesive such as is usually employed.

As regards core adhesive, various types are possible, but gum arabic was used, in two concentrations, i. e., 0.3% and 1% on the mix respectively. The adhesion in this case, both dry and wet, was 10.

As regards quicker setting mixes, the above core mix was accelerated with a standard accelerator, i. e., ground gypsum, giving an initial set of 5 minutes and a final set of 10 minutes, the board produced being perfectly normal as above.

*Example 2*

A plasterboard was made from the following core mix employing gauging water at 50° C.

| | Parts by weight |
|---|---|
| Slag | 60 |
| Stucco | 40 |
| Portland cement clinker | 3 |
| Dextrine | 1 |
| Sawdust | 4 |
| Water | 45 |

The particle size of this core was the same as in Example 1. 5 parts by weight of ground plasterboard core was introduced into the mixer. The wet mix was applied to wallboard liner. The boards set quickly and attained cutting set at 6½ minutes. They were dried at a temperature of 70° C.

Without the addition of the accelerator the boards would not have attained cutting set before 18 minutes. When the gypsum was omitted and the temperature of the gauging water was 20° C. the cutting interval was 24 minutes.

*Example 3*

A plasterboard was made from the following core mix employing water at 50° C.

| | Parts by weight |
|---|---|
| Slag | 60 |
| Stucco | 40 |
| Portland cement clinker | 3 |
| Sawdust | 4 |
| Water | 45 |

The particle size of this core mix was the same as in Example 1. 2% ground plasterboard core was added in the mixer as accelerator. This mix was applied to liners which had been coated 20 seconds before with 0.2 lb. per square yard of a coating having the following composition.

| | Parts by weight |
|---|---|
| Phosphate stucco | 100 |
| Dextrine | 5 |
| Scutch retarder | 0.04 |
| Water | 65 |

Initial adhesion developed in 9 minutes and the board could be cut at 10 minutes. The final core adhesion value was 9 and only fell to 8 after 48 hours exposure to saturated air.

*Example 4*

A plasterboard was made from the following core mix employing water at 50° C.

| | Parts by weight |
|---|---|
| Slag | 60 |
| Stucco | 40 |
| Portland cement clinker | 3 |
| Sawdust | 4 |
| Water | 45 |

The particle size of this core was the same as in Example 1. 2% ground plasterboard core was added in the mixer as accelerator. This mix was applied to liners which had been precoated with the following mix, dried by passage over a hot roll at 140–180° C., the time of contact being 40 seconds, and then stored.

| | Parts by weight |
|---|---|
| Phosphate stucco | 100 |
| Dextrine | 5 |
| Scutch retarder | 0.04 |
| Water | 100 |

Initial adhesion develops in 12 minutes, and the board can be cut at 13 minutes. The final core adhesion value was 8, and fell to 8–7 after 48 hours' exposure to saturated air. Unsatisfactory final core adhesion and very long delay in the development of initial adhesion were obtained when this core mix was used without the positive bond coating and with 1 per cent. of dextrine as core adhesive.

We have found that plaster boards made by this process can be dried at those temperatures normally used in the industry when the normal core of plaster of Paris alone or with fillers is employed. Such temperatures are as follows. The inlet temperature of the drier is 130°–300° C. preferably 130–150° C., and the outlet temperature may be 70°–130° C. and is preferably 100°–125° C. When the new board is made by such normal drying, we have found that the strengths of such board are similar to those of normal plaster board, i. e., not effectively higher. But we have found that by drying at lower temperatures, preferably in a range between 50 and 70° C. stronger boards are obtained, chiefly because the normal hydration and strength development of the core is not arrested but encouraged. Of course, temperatures below 50° C. will produce strong dried boards, but at such temperatures the drying efficiency is reduced.

Plaster board made according to the invention is characterised by high mechanical strength and resistance to water and corrosive substances found in the atmospheres of large towns. Accordingly it is suitable for external building work. Actually the strength of the core increases rather than decreases under constant wetting.

In this respect the core resembles Portland cement, but unlike Portland cement it is not markedly alkaline and consequently has no harmful effect upon the fibre liner or on any decoration superimposed thereon.

If a light weight or cellular core is desired, foam containing mixes may be used in the same way as in making plaster of Paris board.

As many apparently widely different embodiments of this invention may be made without departing from the spirit and scope thereof, it is to be understood that the invention is not limited to the specific embodiments thereof except as defined in the appended claims.

We claim:

1. A composite board comprising a layer of set water-setting cement bonded on both sides to liners of fibrous material, said cement comprising between 40 and 60 parts by weight of calcium sulphate, between 60 and 40 parts by weight of blast furnace slag, and between 1 and 15 parts by weight of an exciter comprising available lime.

2. A composite board comprising a layer of set water-setting cement bonded on both sides to liners of fibrous material, said cement comprising a set mix containing between 40 and 60 parts by weight of calcium sulphate, between 60 and 40 parts by weight of blast furnace slag of which at least 60 per cent. by weight of the particles are less than 30 microns, and between 1 and 15 parts by weight of an exciter comprising available lime, at least 60 per cent. by weight of the particles of the exciter being less than 30 microns.

3. A composite board as claimed in claim 1, in which the cementitious material is free from adhesive.

4. A composite board as claimed in claim 1, in which the cementitious material contains a proportion of adhesive not greater than 1 per cent. by weight, said adhesive being selected from the group consisting of gum arabic, starch and dextrine.

5. A composite board as claimed in claim 1, in which the exciter is Portland cement clinker.

6. A composite board as claimed in claim 1, in which at least a portion of the calcium sulphate constituent of the cement, consists of calcium sulphate hemihydrate.

7. A composite board as claimed in claim 1, in which a foam-containing mix is employed.

8. A composite board as claimed in claim 1, in which the mix contains a small proportion of finely-divided gypsum, e. g., ground set plaster of Paris.

9. A composite board as claimed in claim 1, in which all of the calcium sulphate constituent of the cement, consists of calcium sulphate hemihydrate.

JOSEPH JOHN ETRIDGE.
JOHN BRISCOE SANDFORD.
VICTOR LEFEBURE.